(12) United States Patent
Takeuchi et al.

(10) Patent No.: US 11,635,007 B2
(45) Date of Patent: Apr. 25, 2023

(54) MUFFLER

(71) Applicant: FUTABA INDUSTRIAL CO., LTD., Okazaki (JP)

(72) Inventors: Masaya Takeuchi, Okazaki (JP); Masahiro Kajikawa, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 114 days.

(21) Appl. No.: 17/164,233

(22) Filed: Feb. 1, 2021

(65) Prior Publication Data
US 2021/0270158 A1   Sep. 2, 2021

(30) Foreign Application Priority Data

Mar. 2, 2020   (JP) .............................. JP2020-034995

(51) Int. Cl.
| | |
|---|---|
| *F01N 1/02* | (2006.01) |
| *G10K 11/172* | (2006.01) |
| *G10K 11/16* | (2006.01) |

(52) U.S. Cl.
CPC .............. *F01N 1/02* (2013.01); *G10K 11/161* (2013.01); *G10K 11/172* (2013.01)

(58) Field of Classification Search
CPC . F01N 1/02; F01N 1/023; F01N 1/026; F01N 2470/08; F01N 2470/24
See application file for complete search history.

(56) References Cited

U.S. PATENT DOCUMENTS

| | | | | |
|---|---|---|---|---|
| 2,075,263 A | * | 3/1937 | Bourne ................. | F16L 55/033 181/256 |
| 2,184,891 A | * | 12/1939 | Bourne .................... | F01N 1/02 181/273 |
| 2,233,804 A | * | 3/1941 | Bourne ................. | F16L 55/033 138/30 |
| 2,297,046 A | * | 9/1942 | Bourne .................... | F01N 1/02 110/184 |
| 5,952,625 A | * | 9/1999 | Huff ........................ | F01N 1/06 181/266 |

(Continued)

FOREIGN PATENT DOCUMENTS

| | | |
|---|---|---|
| DE | 102008020721 A | 10/2009 |
| JP | S41005207 B | 3/1966 |

(Continued)

OTHER PUBLICATIONS

Notice of Reasons for Refusal for Japanese Patent Application No. 2020-034995 dated Feb. 15, 2022, 8 pages including English translation.

(Continued)

*Primary Examiner* — Jeremy A Luks
(74) *Attorney, Agent, or Firm* — Withrow & Terranova, P.L.L.C.; Vincent K. Gustafson

(57) ABSTRACT

One aspect of the present disclosure provides a muffler including an exhaust pipe and a space forming member. The exhaust pipe has a cylindrical shape having a flow passage inside through which exhaust gas passes. The space forming member forms closed spaces between itself and the exhaust pipe, the closed spaces being branched from the flow passage and adjacent to the flow passage. Each of the closed spaces and the flow passage communicate with one another via a single communication hole.

8 Claims, 5 Drawing Sheets

(56) References Cited

U.S. PATENT DOCUMENTS 7,942,239 B2 * 5/2011 Huff .................. F01N 1/023
                                                                                                 181/266
2010/0270103 A1 10/2010 Huff et al.

FOREIGN PATENT DOCUMENTS

| | | |
|---|---|---|
| JP | S41005325 B | 3/1966 |
| JP | S61138813 U | 8/1986 |

OTHER PUBLICATIONS

First Office Action for Chinese Patent Application No. 202110225688.3, dated Nov. 2, 2022, 12 pages.

* cited by examiner

MUFFLER

CROSS-REFERENCE TO RELATED APPLICATIONS

The present application claims the benefit of Japanese Patent Application No. 2020-34995 filed on Mar. 2, 2020 with the Japan Patent Office, the entire disclosure of which is incorporated herein by reference.

BACKGROUND

The present disclosure relates to a muffler.

There is known an automotive exhaust system that comprises a sub-muffler provided between a catalyst disposed at an upstream of an exhaust passage and a main muffler disposed at a downstream of the exhaust passage. For example, Japanese Unexamined Patent Application Publication No. S61-138813 discloses a sub-muffler having a double pipe structure comprising an inner pipe and an outer pipe. In the sub-muffler, a space between the inner pipe and the outer pipe and an inside of the inner pipe are communicated with each other via a communication hole of the inner pipe, and the space functions as a branch pipe of the inner pipe. The communication hole is positioned in a middle of the space along a longitudinal direction, and achieves muffling of sound waves with a plurality of frequencies.

SUMMARY

However, there is an issue in the aforementioned configuration that the space functioning as the branch pipe is likely to be deficient in capacity, and there is a high likelihood of insufficient reduction of sound waves with a certain frequency.

In one aspect of the present disclosure, it is preferable that sound waves with a certain frequency can be favorably reduced in a muffler.

One aspect of the present disclosure provides a muffler comprising an exhaust pipe and a space forming member. The exhaust pipe has a flow passage inside through which exhaust gas passes, and is formed in a cylindrical shape. The space forming member forms closed spaces between itself and the exhaust pipe, the closed spaces being branched from the flow passage and adjacent to the flow passage. Each of the closed spaces and the flow passage communicate with one another via a singly provided communication hole.

In such a configuration, a side-branch type muffler is formed, and the closed spaces function as resonance chambers. The capacity of the space, which functions as the branch pipe, can be easily reserved by providing the closed spaces, and thus a capability of muffling sound waves with the certain frequency can be improved.

In one aspect of the present disclosure, the closed spaces may be arranged in a radial direction or a circumferential direction of the exhaust pipe in a cross-section of the exhaust pipe that is orthogonal to a flow direction of the exhaust gas in the flow passage.

Such a configuration enables arrangement of the closed spaces independently functioning as branch pipes.

In one aspect of the present disclosure, the space forming member may be arranged so as to form the closed spaces extending along the flow direction of the exhaust gas in a circumference of the exhaust pipe, and together with the exhaust pipe, may form a multiple pipe.

In this configuration, the muffler can be formed of the multiple pipe, and therefore a size of the muffler can be made smaller than that of a muffler having a branch pipe extending from an exhaust pipe in a circumferential direction.

In one aspect of the present disclosure, the space forming member may be arranged in the circumference of the exhaust pipe so as to form the closed spaces extending along the flow direction of the exhaust gas.

In this configuration, the capacity of the space, which functions as the branch pipe, can be easily reserved, and thus the capability of muffling sound waves with the certain frequency can be improved.

In one aspect of the present disclosure, a communication hole may be provided at one end of each of the closed spaces along a longitudinal direction. In this configuration, longitudinal lengths of the closed spaces are ensured more easily, and thus muffling of low-frequency sound waves is effectively achieved.

In one aspect of the present disclosure, the longitudinal direction of each of the closed spaces may correspond to a direction the flow direction of the exhaust gas in the exhaust pipe. In the present disclosure, to correspond includes meaning of to substantially correspond.

With this configuration, lengths of the closed spaces are easily ensured.

In one aspect of the present disclosure, the longitudinal direction of each of the closed spaces may correspond to the flow direction of the exhaust gas in the exhaust pipe, and the closed spaces may be arranged in the circumferential direction of the exhaust pipe.

With this configuration, the closed spaces adjacent to the exhaust pipe are effectively arranged.

In one aspect of the present disclosure, the muffler may be configured as a sub-muffler provided at an upstream of the main muffler in an exhaust passage.

With this configuration, noise caused by the exhaust gas can be favorably reduced.

BRIEF DESCRIPTION OF THE DRAWINGS

Embodiments of the present disclosure will be described hereinafter with reference to the accompanied drawings, in which.

DETAILED DESCRIPTION OF EXEMPLARY EMBODIMENTS

1. Embodiment

[1-1. Configuration]

Figure 1:
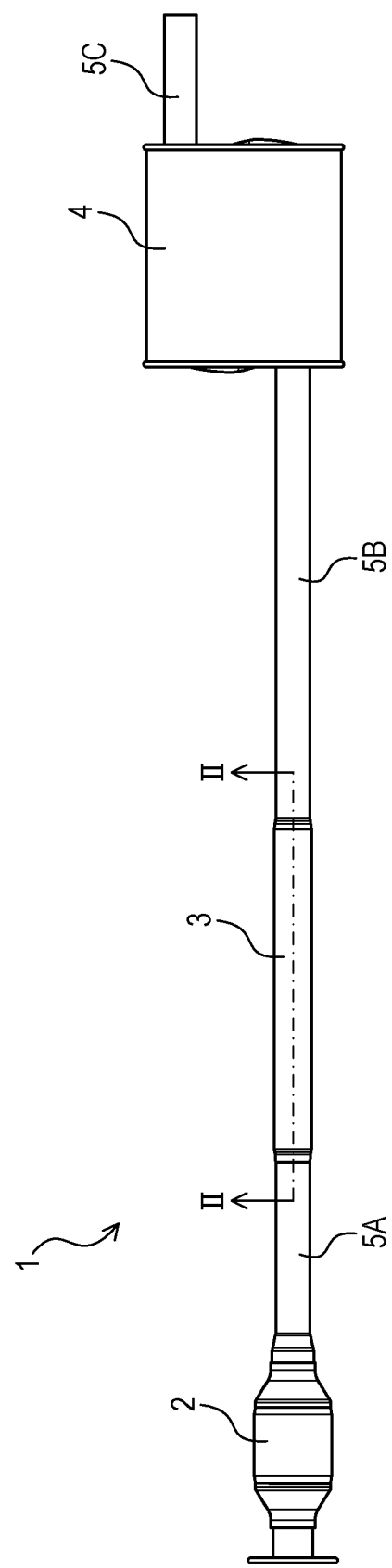
FIG. 1 is a plane view illustrating a schematic configuration of an exhaust system.

An exhaust system 1 shown in FIG. 1 forms an exhaust passage of an internal combustion engine. The exhaust system 1 comprises: a catalytic converter 2; a muffler 3 as a sub-muffler; and a main muffler 4.

The exhaust system 1 can be used in any internal combustion engines without a particular limitation, including those used for transportation equipment such as automobiles, railways, vessels, and construction machines, and those used for drivers or generators in power facilities and the like.

The catalytic converter 2 is a purification device of exhaust gas G, and reforms or collects environmental pollutants in the exhaust gas G. The catalytic converter 2 is disposed at an upstream of the muffler 3, and comprises a catalyst and so on. The main muffler 4 is disposed at a downstream of the muffler 3, and further muffles exhaust sound of the exhaust gas G that comes passing the muffler 3.

The catalytic converter 2 is coupled to the muffler 3 via a first pipe 5A. The muffler 3 is coupled to the main muffler 4 via a second pipe 5B. After passing the main muffler 4, the exhaust gas G is discharged from a third pipe 5C.

<Muffler>

Figure 2:
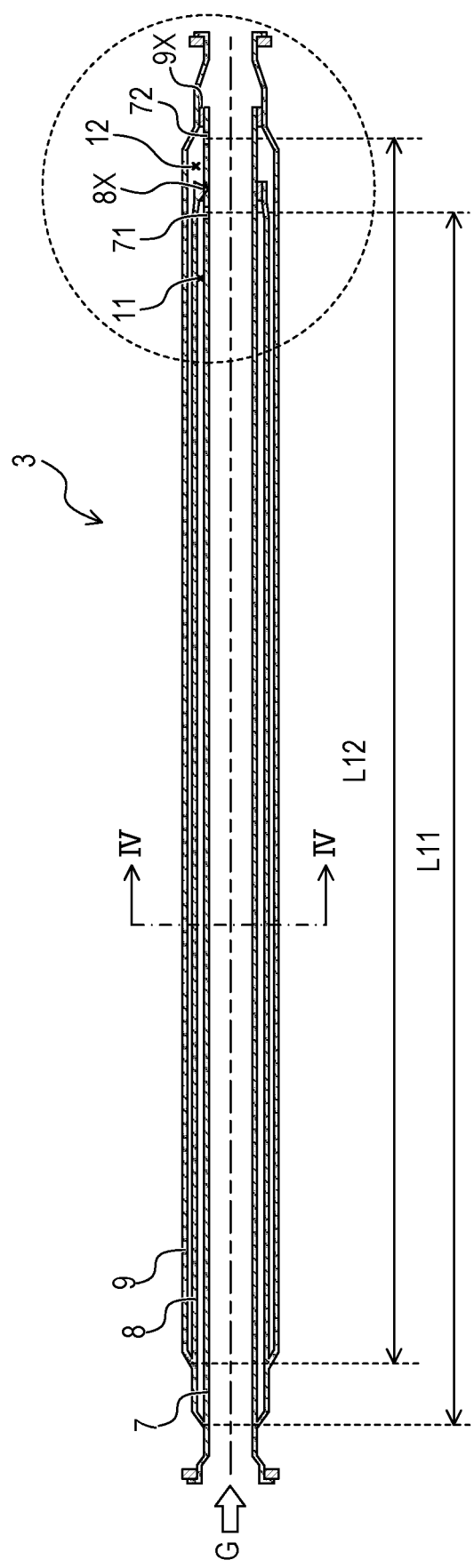
FIG. 2 is a cross-section view of a muffler in II-II.
Figure 3:
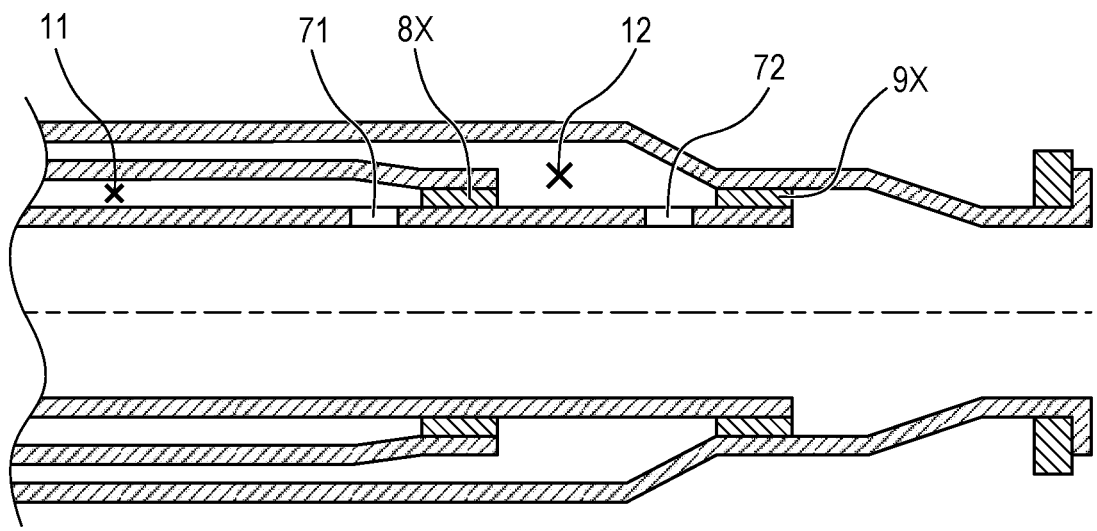
FIG. 3 is an enlarged view of the muffler shown in FIG. 2.
Figure 4:
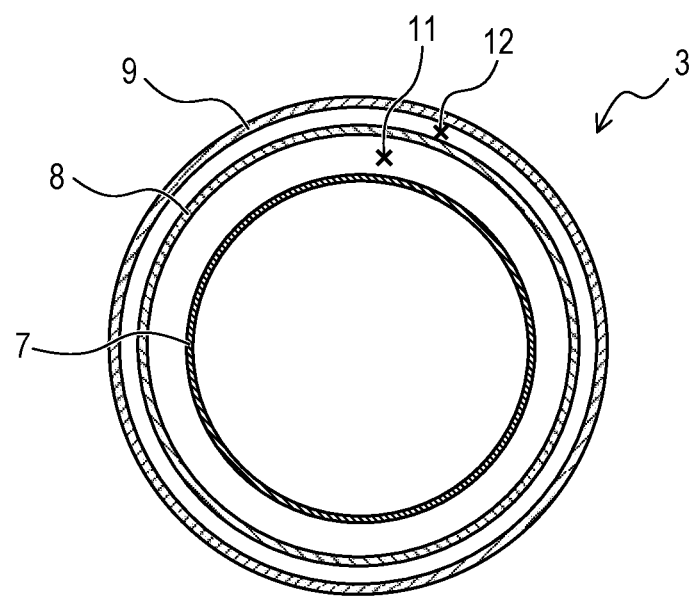
FIG. 4 is a sectional view of the muffler taken along line IV-IV in FIG. 2.

As shown in FIG. 2 and FIG. 4, the muffler 3 comprises: an inner pipe 7; a middle pipe 8; and an outer pipe 9, each having a cylindrical shape. FIG. 3 is an enlarged view of the muffler 3, more specifically, FIG. 3 is an enlarged view of a portion enclosed in a dashed circle in FIG. 2. The muffler 3 has a triple pipe structure formed of the inner pipe 7, the middle pipe 8, and the outer pipe 9. The inner pipe 7 corresponds to an exhaust pipe of the present disclosure, and the middle pipe 8 and the outer pipe 9 correspond to space forming members of the present disclosure.

(Inner Pipe)

The inner pipe 7 is formed in a cylindrical shape to allow the exhaust gas G to pass through inside. More specifically, after passing the catalytic converter 2, the exhaust gas G enters an inner side of the inner pipe 7 from an end on the upstream side (left side, in FIG. 2 and FIG. 3), flows along an arrow direction in FIG. 2, and is discharged from an end on the downstream side.

(Middle Pipe and Outer Pipe)

As shown in FIG. 2 and FIG. 4, the middle pipe 8 is arranged to surround an outer-circumferential surface of the inner pipe 7. The middle pipe 8 is set to have a total length shorter than that of the inner pipe 7, has a reduced diameter in an upstream end in an axial direction, and is joined to the inner pipe 7 without any gap.

As shown in FIG. 2 and FIG. 4, the outer pipe 9 is arranged to further surround an outer-circumferential surface of the middle pipe 8. That is, the outer pipe 9 is configured to have the middle pipe 8 and the inner pipe 7 arranged at an inner peripheral side thereof. Each of axial ends of the outer pipe 9 extends more axially outwardly than each of axial ends of the inner pipe 7.

Both ends of the outer pipe 9 are reduced in diameter and the each is joined to the inner pipe 7 without any gap. In FIG. 2, 8X indicates a joint portion between the middle pipe 8 and the inner pipe 7, and 9X indicates a joint portion between the outer pipe 9 and the inner pipe 7, the both joint portions being situated at a downstream portion of the muffler 3.

More particularly, an upstream portion of the outer pipe 9 is joined to the middle pipe 8 without any gap at a downstream side of a joint portion where the upstream portion of the outer pipe 9 and the inner pipe 7 are joined. A downstream portion of the outer pipe 9 has a reduced diameter in the downstream side of the joint portion 8X between the middle pipe 8 and the inner pipe 7 in an axial direction, and forms the joint portion 9X between itself and the inner pipe 7 in the downstream side of the joint portion 8X between the middle pipe 8 and the inner pipe 7. That is to say, at the downstream portion of the outer pipe 9, cavities are formed between the outer pipe 9 and the middle pipe 8 and between the outer pipe 9 and the inner pipe 7.

Cross-sections of the inner pipe 7, the middle pipe 8 and the outer pipe 9 form a concentric circle sharing the same central axis. An inner diameter of the outer pipe 9 is set greater than an outer diameter of the middle pipe 8, and an inner diameter of the middle pipe 8 is set greater than an outer diameter of the inner pipe 7.

In this configuration, the middle pipe 8 and the outer pipe 9 each forms closed spaces 11, 12 between itself and the inner pipe 7, the closed spaces being adjacent to the flow passage of the exhaust gas G in the inner pipe 7 in the circumference of the inner pipe 7 and extending along a flow direction of the exhaust gas G. In other words, a longitudinal direction of each of the closed spaces 11, 12 corresponds to the flow direction of the exhaust gas G in the inner pipe 7.

The closed spaces 11, 12 are arranged in a radial direction of the inner pipe 7, in a cross-section of the inner pipe 7 that is orthogonal to the flow direction of the exhaust gas G in the flow passage.

(Communication Holes)

The inner pipe 7 comprises communication holes 71, 72. Every one of the communication holes 71, 72 is situated near a downstream end of the inner pipe 7. The communication holes 71, 72 are provided spaced apart from one another along an axial direction of the inner pipe 7. In other words, the communication holes 71, 72 are displaced from one another along the axial direction of the inner pipe 7.

The communication hole 71 on the upstream side is situated near and on an upstream side of the joint portion 8X between the middle pipe 8 and the inner pipe 7. The communication hole 71 on the upstream side communicates the closed space 11, which is a cavity provided between the middle pipe 8 and the inner pipe 7, with the inner side of the inner pipe 7.

The communication hole 72 on the downstream side is situated on the downstream side of the joint portion 8X between the middle pipe 8 and the inner pipe 7, and on the upstream side of the joint portion 9X between the outer pipe 9 and the inner pipe 7. The communication hole 72 on the downstream side communicates the closed space 12, which is a cavity provided between the outer pipe 9 and the middle pipe 8, with the inner side of the inner pipe 7.

The closed spaces 11 and 12, respectively, communicate with the flow passage of the exhaust gas G in the inner pipe 7 only via the singly provided communication holes 71 and 72. Each of the communication holes 71, 72 is provided at one end of each of the closed spaces 11, 12 along a longitudinal direction (for example, at a downstream end, in the present embodiment). However, each of the communication holes 71, 72 does not have to be situated at an exact end of the closed space 11 or 12. It is sufficient if the communication holes 71, 72 are situated at positions where the closed spaces 11, 12 are able to attenuate sound waves with a single frequency (strictly speaking, multiples of the single frequency are included).

As shown in FIG. 4, the closed spaces 11, 12 are arranged such that they do not directly communicate with one another in the cross-section of the inner pipe 7 that is orthogonal to the flow direction of the exhaust gas G in the flow passage. In other words, the closed spaces 11, 12 are independent spaces communicating with one another only via the communication holes 71, 72 and the flow passage of the inner pipe 7.

Figure 6:
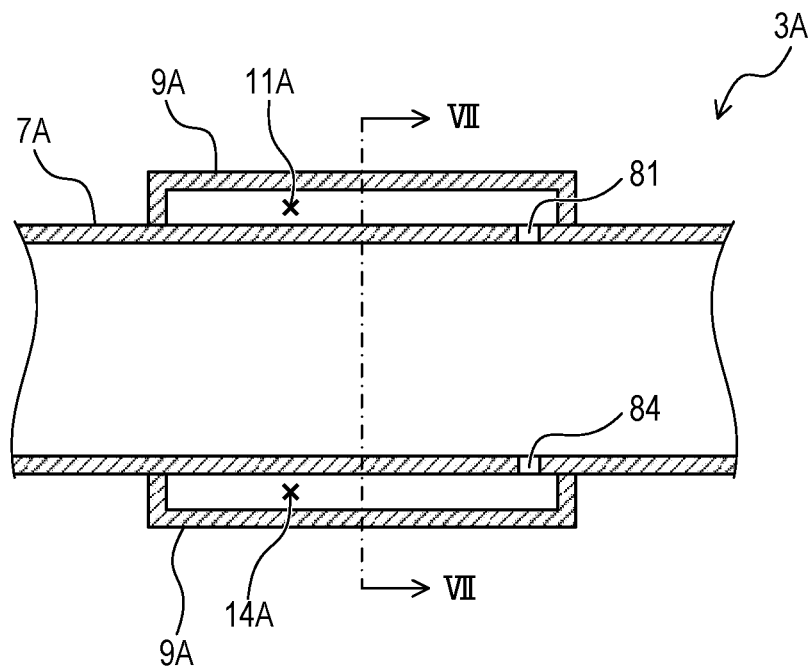
FIG. 6 shows a muffler of another embodiment.
Figure 7:
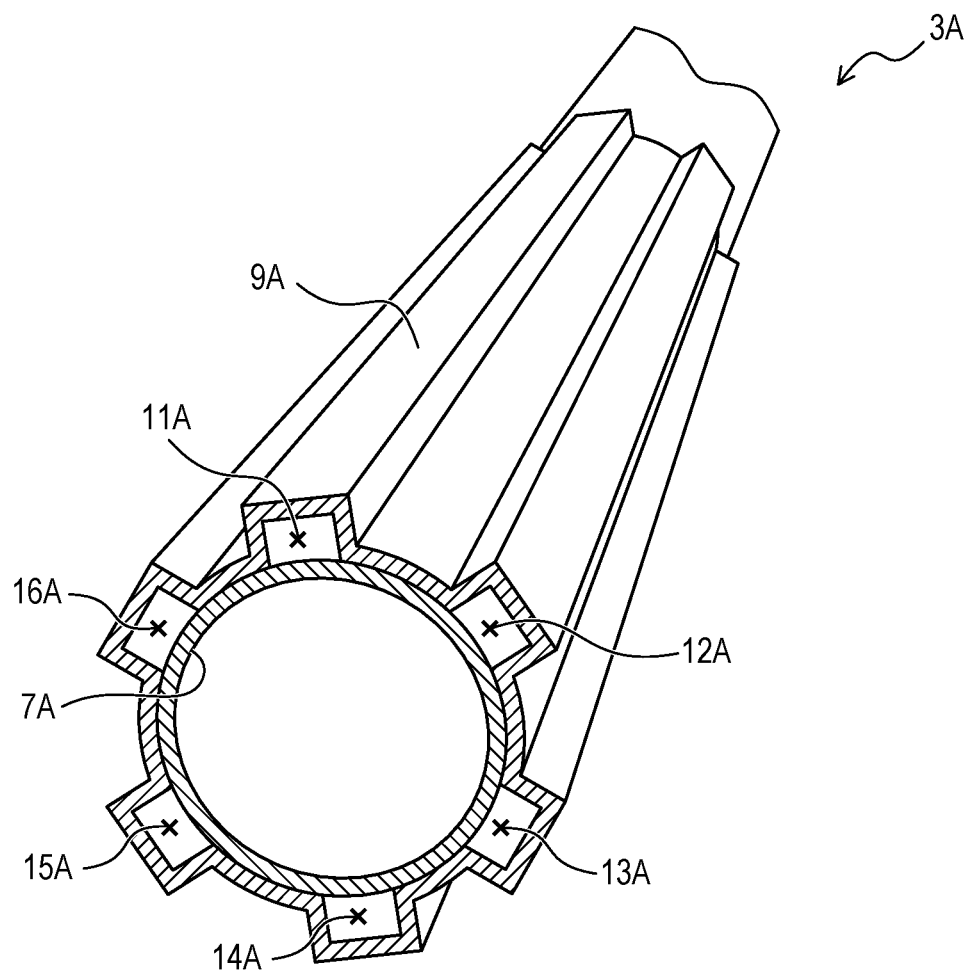
FIG. 7 is a cross-sectional perspective view of the muffler taken along line VII-VII in FIG. 6.

Each of the communication holes 71, 72 has a shape of, for example, a perfect circle (see FIG. 6 and FIG. 7). The communication holes 71, 72 may be in other shapes such as an ellipse, a polygon or the like, or any desired shape.

In an event that air column resonance occurs in the exhaust passage comprising exhaust-passage components including the muffler 3 (that is, the whole exhaust passage disposed in the entire exhaust system 1 shown in FIG. 1), each communication holes 71, 72 are arranged at locations corresponding to locations of an antinode of standing waves in the exhaust passage. With this configuration, the communication holes 71, 72 can reduce sound pressure of the standing waves.

Meanwhile, the muffler 3 functions as the side-branch muffler due to the communication hole 71 or 72 communicating the exhaust passage with the closed space 11 or 12. In other words, reduction in sound pressure of the standing waves and muffling by the side-branch are compatible with each other in the muffler 3.

More specifically, the longitudinal directions of the closed spaces 11, 12 of the present embodiment correspond to the axial directions of the inner pipe 7 and the other pipes, and as shown in FIG. 2, longitudinal lengths L11, L12 of the closed spaces 11, 12 are almost the same. That is, the closed spaces 11, 12 effectively attenuate sound waves with the same frequency in accordance with a principle of superposition. Furthermore, in the muffler 3, the two communication holes 71, 72 are displaced from one another along the axial directions of the inner pipe 7, and thus the longitudinal lengths L11, L12 of the closed spaces 11, 12 can be adjusted to be longer.

Figure 5:
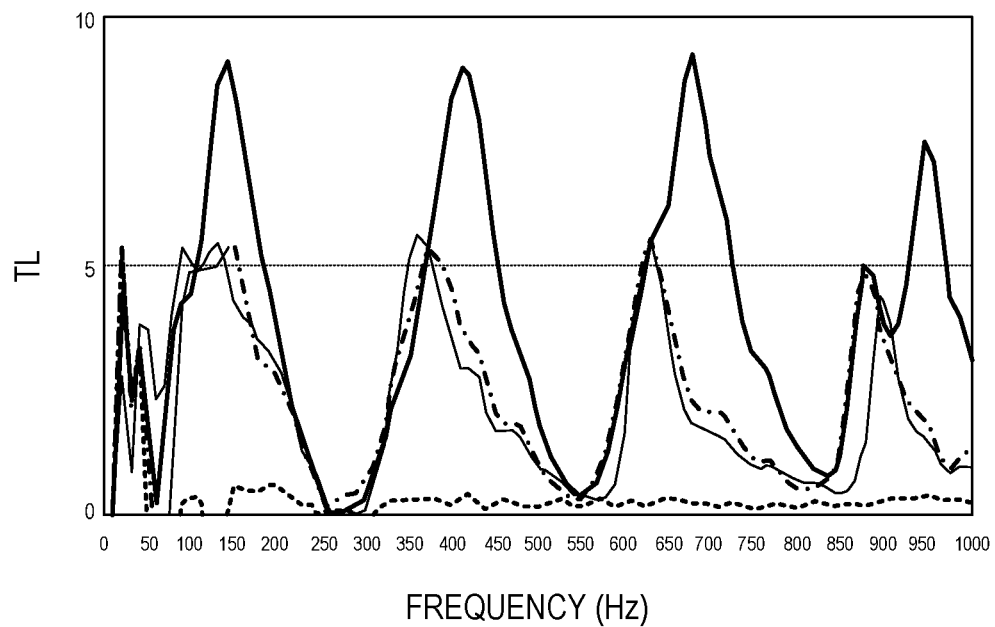
FIG. 5 is a graph showing relationships between frequencies and transmission losses (TL)

Here, FIG. 5 is a graph showing relationships between frequencies of sound waves caused by the exhaust gas G and transmission losses (TL) in a muffler. The transmission loss is an amount of attenuation achieved by the muffler itself, the amount determined by a ratio of a mean incident sound power at an inlet and an outlet of the muffler to a mean transmitted sound power at the inlet and the outlet of the muffler. FIG. 5 indicates that greater the TL is, the higher the muffling effect is. In FIG. 5, a bold solid line corresponds to the muffler 3 as described, and a thin solid line and a rough dotted line each corresponds to the muffler configured as a double pipe. A fine dotted line corresponds to the pipe comprising only the inner pipe 7.

FIG. 5 shows that the transmission loss of the muffler 3 indicated by the bold solid line is much greater than that of the muffler configured as a double pipe, or that of the pipe comprising only the inner pipe 7, and muffling effect of the muffler 3 can be preferably achieved.

[1-2. Effect]

According to the aforementioned embodiment, the following effects can be obtained.

(1a) One aspect of the present disclosure is to provide the muffler 3 comprising: the inner pipe 7; the middle pipe 8; and the outer pipe 9. The inner pipe 7 has a cylindrical shape comprising the flow passage inside through which the exhaust gas G passes.

Each of the middle pipe 8 and the outer pipe 9 forms the closed spaces 11, 12 between itself and the inner pipe 7, the closed spaces 11, 12 being branched from the flow passage and adjacent to the flow passage. The closed spaces 11 and 12, respectively, communicate with the flow passage via the singly provided communication holes 71 and 72.

In such a configuration, the side-branch type muffler 3 is formed and the closed spaces 11, 12 function as resonance chambers. The capacity of the space functioning as the branch pipe can be easily reserved by providing the closed spaces 11, 12, and thus a capability of muffling sound waves with a certain frequency can be improved.

(1b) In one aspect of the present disclosure, the closed spaces 11, 12 are arranged in the radial direction of the inner pipe 7, in the cross-section of the inner pipe 7 that is orthogonal to the flow direction of the exhaust gas G in the flow passage.

In such a configuration, the independent closed spaces 11, 12 can be reliably arranged.

(1c) In one aspect of the present disclosure, the middle pipe 8 and the outer pipe 9 are arranged so as to form the closed spaces 11, 12 extending along the flow direction of the exhaust gas G in the circumference of the inner pipe 7, and together with the inner pipe 7, form a multiple pipe.

In this configuration, the muffler 3 is formed of the multiple pipe, and therefore the size of the muffler 3 can be made smaller than that of a muffler having a branch pipe extending from the inner pipe 7 in the circumferential direction.

(1d) In one aspect of the present disclosure, each of the communication holes 71, 72 may be provided at one end of each of the closed spaces 11, 12 along the longitudinal direction.

In this configuration, longitudinal lengths of the closed spaces 11, 12 are ensured more easily, and thus muffling of low-frequency sound waves by using the side-branch is effectively achieved.

(1e) In one aspect of the present disclosure, the longitudinal direction corresponds to the flow direction of the exhaust gas G in the inner pipe 7.

In this configuration, the lengths of the closed spaces 11, 12 can be easily ensured.

(1f) In one aspect of the present disclosure, the longitudinal directions of the closed spaces 11, 12 correspond to the flow direction of the exhaust gas G in the inner pipe 7, and the closed spaces 11, 12 are arranged in the circumferential direction of the inner pipe 7.

With this configuration, the closed spaces 11, 12 adjacent to the inner pipe 7 are effectively arranged.

2. Other Embodiments

Although the embodiments of the present disclosure have been explained hereinbefore, the present disclosure may be achieved in various modifications without being limited to the aforementioned embodiments.

(2a) Although the aforementioned embodiments describe an example of the present disclosure where the exhaust pipe is the inner pipe 7, the exhaust pipe is not limited to this. For example, the exhaust pipe of the present disclosure may be the middle pipe 8 or the outer pipe 9. For such a configuration, it is desirable that an inner pipe is provided such that the closed spaces 11, 12 are formed inside of the middle pipe 8 or the outer pipe 9.

(2b) Although the aforementioned embodiments describe the muffler 3 in which the closed spaces 11, 12 are arranged adjacent to outside of the inner pipe 7 in the radial direction of the inner pipe 7, the muffler 3 is not limited to this. For example, as shown in FIG. 6 and FIG. 7, a muffler 3A may be provided with closed spaces 11A, 12A, 13A, 14A, 15A, 16A (11A to 16A) arranged in the circumferential direction of the inner pipe 7.

More particularly, in examples shown in FIG. 6 and FIG. 7, the muffler 3A is configured as a double pipe formed of the inner pipe 7 and the outer pipe 9, in which the closed spaces 11A to 16A are formed by folding the outer pipe 9 into ridges and grooves along the axial direction on outside of the inner pipe 7. The closed spaces 11A to 16A may communicate with one another only via the inner side of the inner pipe 7. In other words, the inner pipe 7 may be provided with a single communication hole, such as communication hole 81 or 84, corresponding to each of the closed spaces 11A to 16A. The outer pipe 9 can be easily produced by combining components divided in a circumferential direction.

(2c) Although the aforementioned embodiments describe an arrangement in which the communication holes 71, 72 are provided in downstream portions of the closed spaces 11, 12, the communication holes 71, 72 may be provided in upstream portions of the closed spaces 11, 12. In this case, the upstream and downstream of the muffler 3 are reversed, and the muffler 3 may be provided in the exhaust passage.

(2d) Although the muffler 3 is configured as a triple pipe in the aforementioned embodiment, the muffler 3 may be configured as a multiple pipe other than a triple pipe.

(2e) Functions of one element of the above-described embodiments may be performed by elements. One function of one element may be performed by elements. Functions of elements may be performed by one element. One function of elements may be performed by one element. Part of the configurations of the above-described embodiments may be omitted. At least one of the configurations of the above-described embodiments may be added to or replaced with the configurations of the other above-described embodiments.

What is claimed is:

1. A muffler comprising:
an exhaust pipe having a cylindrical shape comprising a flow passage inside through which exhaust gas passes; and
a space forming member that forms closed spaces between itself and the exhaust pipe so that each of the closed spaces does not communicate with one another, the closed spaces being branched from the flow passage and adjacent to the flow passage,
wherein each of the closed spaces and the flow passage are formed so as to communicate with one another via a single communication hole,
wherein the closed spaces are arranged in a radial direction of the exhaust pipe in a cross-section of the exhaust pipe that is orthogonal to a flow direction of the exhaust gas in the flow passage,
wherein the space forming member is arranged so as to form the closed spaces extending along the flow direction of the exhaust gas in a circumference of the exhaust pipe, and the space forming member forms a multiple pipe together with the exhaust pipe, and
wherein each of the closed spaces is arranged so as to surround a circumference of the flow passage.

2. The muffler according to claim 1,
wherein the communication hole is provided at one end of each of the closed spaces in the flow direction of the exhaust gas.

3. The muffler according to claim 1,
wherein the muffler is configured to be provided as a sub-muffler in an exhaust passage upstream of a main muffler.

4. The muffler according to claim 1,
wherein the closed spaces include a first closed space and a second closed space adjacent to the outside of the first closed space in the radial direction,
wherein the second closed space comprises, at an end thereof, an extending region extending to an upstream or a downstream in the flow direction of the exhaust gas, the extending region extending beyond an end of the first closed space, and
wherein the communication hole allowing the second closed space and the flow passage to communicate with one another is provided in the extending region.

5. The muffler according to claim 2,
wherein the closed spaces include a first closed space and a second closed space adjacent to the outside of the first closed space in the radial direction,
wherein the second closed space comprises, at an end thereof, an extending region extending to an upstream or a downstream in the flow direction of the exhaust gas, the extending region extending beyond an end of the first closed space, and
wherein the communication hole allowing the second closed space and the flow passage to communicate with one another is provided in the extending region.

6. A muffler comprising:
an exhaust pipe having a cylindrical shape comprising a flow passage inside through which exhaust gas passes; and
a space forming member that forms closed spaces between itself and the exhaust pipe so that each of the closed spaces does not communicate with one another, the closed spaces being branched from the flow passage and adjacent to the flow passage,
wherein each of the closed spaces and the flow passage are formed so as to communicate with one another via a single communication hole, and
wherein the closed spaces extend along a flow direction of the exhaust gas in a circumference of the exhaust pipe, and the closed spaces are arranged so as to be spaced apart from one another in a circumferential direction in a cross-section of the exhaust pipe that is orthogonal to the flow direction of the exhaust gas wherein the space forming member is configured as a tubular member arranged to surround the exhaust pipe and the space forming member has grooves protruding outward, wherein the grooves are arranged so as to be spaced apart from one another in the circumferential direction of the exhaust pipe and the grooves extend along the flow direction of the exhaust gas, and wherein the closed spaces are formed between each of the grooves and the exhaust pipe.

7. The muffler according to claim 6,
wherein an end of each of the closed spaces in the flow direction of the exhaust gas has the communication hole.

8. The muffler according to claim 6,
wherein the muffler is configured to be provided as a sub-muffler in an exhaust passage upstream of a main muffler.

* * * * *